May 4, 1954

C. A. SKINNER 2,677,471

TRANSFER APPARATUS

Filed May 14, 1948

INVENTOR.
Charles A. Skinner
BY
Wood, Arey, Herron & Evans
ATTORNEYS.

May 4, 1954

C. A. SKINNER 2,677,471

TRANSFER APPARATUS

Filed May 14, 1948

INVENTOR.
Charles A. Skinner
BY
Wood, Arey, Herron & Evans
ATTORNEYS

May 4, 1954
C. A. SKINNER
2,677,471
TRANSFER APPARATUS
Filed May 14, 1948
5 Sheets-Sheet 3
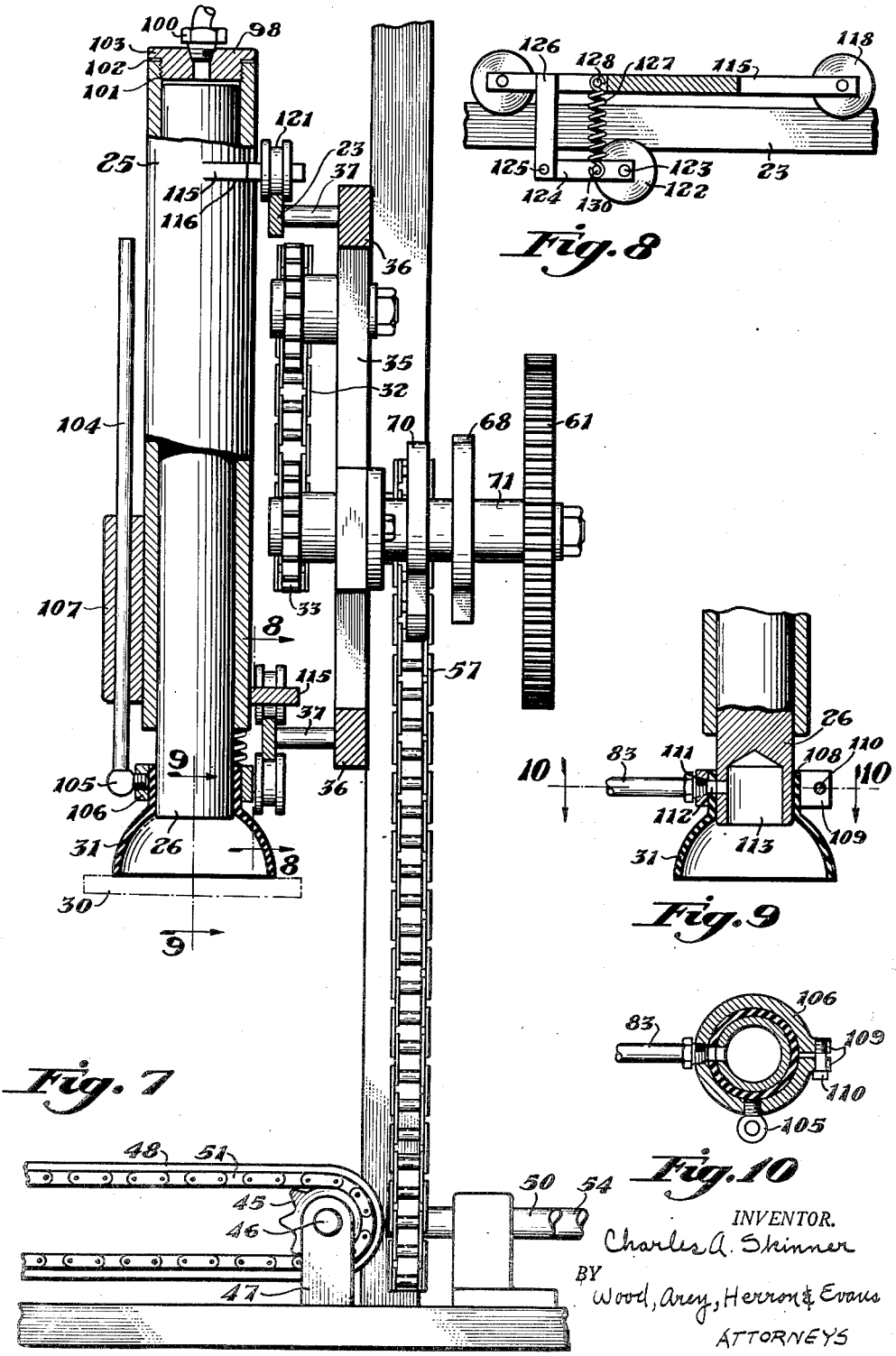
INVENTOR.
Charles A. Skinner
BY
Wood, Arey, Herron & Evans
ATTORNEYS

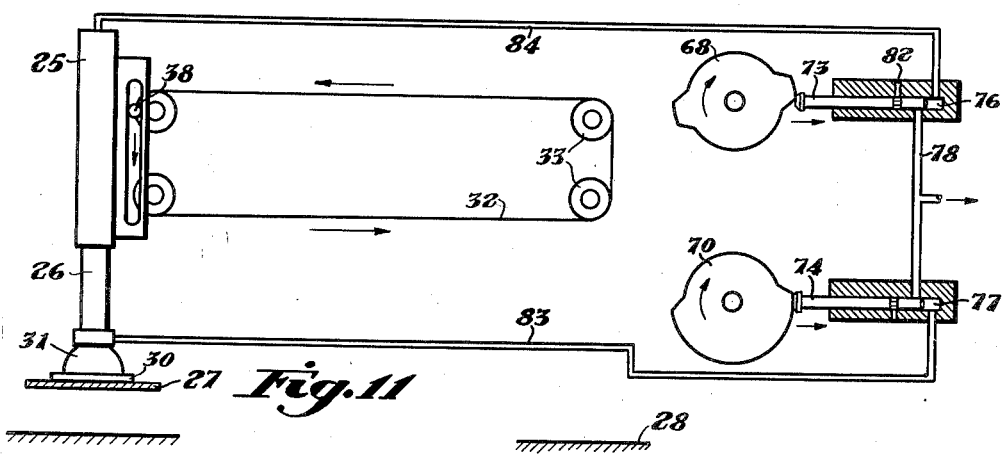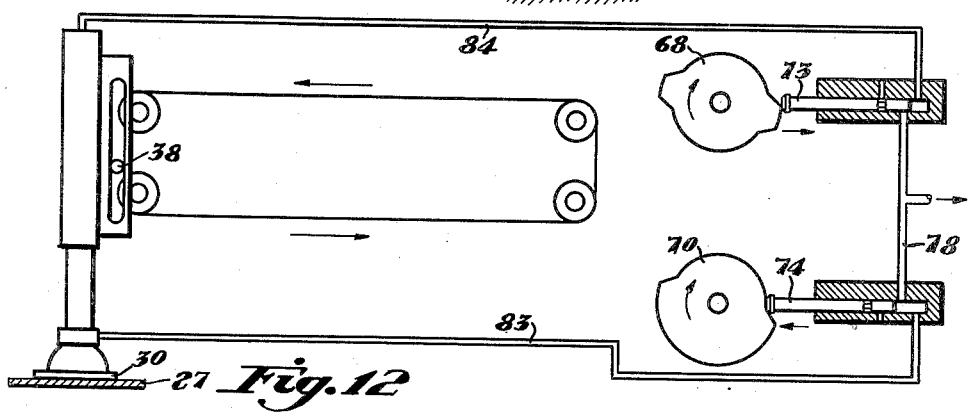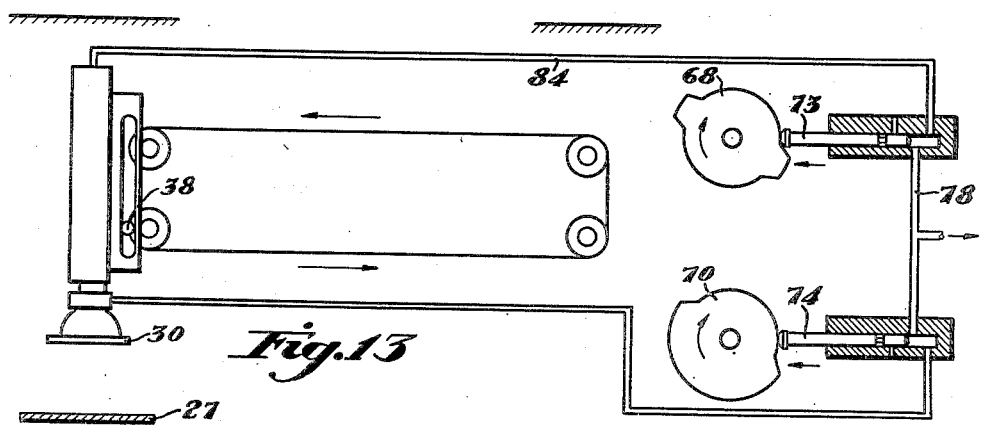

May 4, 1954   C. A. SKINNER   2,677,471
TRANSFER APPARATUS
Filed May 14, 1948   5 Sheets-Sheet 5

INVENTOR.
Charles A. Skinner
BY
Wood, Arey, Herron & Evans
ATTORNEYS

Patented May 4, 1954

2,677,471

UNITED STATES PATENT OFFICE 2,677,471

TRANSFER APPARATUS

Charles A. Skinner, Glendale, Ohio, assignor to The Cambridge Tile and Manufacturing Company, Cincinnati, Ohio, a corporation of Ohio Application May 14, 1948, Serial No. 27,138

5 Claims. (Cl. 212—11)

This invention relates to the mechanical handling of fragile articles such as ceramic ware, pieces of tile, cups, bottles and glassware generally. The invention is directed particularly to an apparatus for stacking and unstacking articles of such a nature in an automatic and continuous manner whereby the pieces as desired may be transferred from one conveyor or support to another in prearranged order. The invention is disclosed particularly in relation to tile manufacture since it is particularly useful in this industry, but also may be employed in handling bottles as in the process of cleaning or packing, and for other purposes where the tedium and time involved in manual handling is to be eliminated.

The apparatus is intended for operation in conjunction with a conveyor system capable of advancing preferably in a stepwise or intermittent manner and the apparatus consists essentially of a suction cup which is arranged to engage the ware, a plunger for carrying the suction cup at an endwise portion thereof and a simple, reliable apparatus for cyclically raising and lowering the plunger and translating it in a substantially horizontal direction for holding the ware upon the suction cup. In order that the ware may be conveyed or deposited, a pneumatic system is utilized, air being exhausted from the suction cup for pick-up purposes and air being admitted to the suction cup with or without positive pressure for release purposes. As applied to the transfer of other articles, such as packing bottles in cartons, the design of the suction cup may be changed readily to accommodate the article.

The cyclic operation of the plunger and suction cup in conjunction with the conveyor capable of being advanced in stepwise fashion to bring successive pieces of ware or stacks of ware into engageable positions, enables the apparatus to be used either for stacking or unstacking purposes. In the tile industry, for example, the pieces flow by conveyors from a pressing or forming machine to one or a series of stations at which the pieces may be transferred to branch conveyors or may be stacked in racks for firing or further processing. It has been the customary practice in the industry to transfer the pieces by hand since the brittle nature of the ware causes it to become cracked or chipped easily, and also it would be desirable in any event to arrange the pieces in fairly accurate arrangements or stacks for space conservation. In similar manner the finished pieces of tile must be arranged in stacks for deposit in cartons or boxes and this operation was customarily performed by hand. The principal objective of this invention has been to provide a simple apparatus which will perform such stacking, unstacking or transferring operations in an automatic manner and thereby eliminate the manual labor which is involved at present.

For stacking purposes, the apparatus is interconnected with the conveyor such that the movements of the plunger and suction cup are correlated with the stepwise advance of the pieces, the pieces being presented successively to the suction cup. During the conveyor stationary period, the plunger descends until contact is made with the work piece, air is exhausted from the cup, the plunger then ascends and carries the piece laterally from the conveyor. On reaching its lateral limit, the plunger descends, air is admitted to the cup to release the work, after which the plunger ascends and returns to its starting position. After the next advancement of the conveyor, the cycle is repeated and since each piece is deposited in the same position, it will be apparent that the pieces will be placed one upon another in stacked relationship. For unstacking purposes, the apparatus is operated in the same general manner as for stacking except that the direction of the apparatus is reversed relative to the conveyor to pick pieces from a stationary stack and deposit them in a series on the conveyor. Also, the work pieces can be transferred to or from the conveyor in stacks by causing the conveyor to remain stationary during the transfer of a series of pieces, thus building up stacks on the conveyor or removing stacks from the conveyor to an adjacent point. Thus, two groups of transfer devices, operating at remote points in unison may load and unload the conveyor and automatically distribute the pieces as required.

Briefly, it is the concept of the invention to provide an apparatus having a vertically movable plunger, mounted upon a carriage which is reciprocated horizontally at an angle relative to an intermittent conveyor, the movements of the plunger being timed in relation to the conveyor and bearing a suction cup adapted to engage and pick up articles individually, lift them vertically and deposit them to one side, either to or from the conveyor.

As applied to removing articles such as tiles or bottles, from a conveyor the transfer apparatus establishes a surface engagement with the article by the suction cup and lifts the article directly from the conveyor surface, elevates it, transports it laterally and deposits it gently at a lateral point. This is achieved by causing the suction cup to move laterally of the conveyor in a path corresponding to an inverted U, whereby the cup moves horizontally in an elevated path to clear the walls of a receptacle in which the piece is to be deposited, then descends vertically into the receptacle. The cup bearing plunger is slidably disposed in a cylinder and is elevated by vacuum and descends under the influence of gravity. To permit descent, atmospheric pressure is admitted into the cylinder when the plunger reaches the limits of its horizontal translation. By providing a relief orifice of regulated size, air intake is metered and the rate of descent conveniently regulated to avoid shocks and to deposit the articles gently.

By virtue of compactness and unitary structure, the device is capable of application at one or several points along a primary conveyor run to transfer the articles where required, thus rendering a conveyor system more flexible and adaptable. Furthermore, being self-contained and compact, the units may be grouped in gang formation to transfer simultaneously the articles collectively to or from the primary conveyor to lateral points.

In the drawings:

Figure 7 is an enlarged vertical sectional view taken on line 7—7, Figure 1 further detailing the mechanical details of the transfer apparatus.

Figure 8 is a sectional view taken on line 8—8, Figure 7 illustrating a portion of the carriage upon which is mounted the cylinder and pick-up plunger.

Figure 9 is an enlarged fragmentary view partially in section, detailing the structure of the suction cup at the lower end of the pick-up plunger.

Figure 10 is a sectional view taken on line 10—10, Figure 9 further detailing the suction cup mounting means.

Figures 11 to 16 inclusive are diagrammatic views illustrating various positions of the carriage and pick-up plunger during a cycle of operation, the position of the control cams and valve plungers being illustrated in conjunction with the cylinder and plunger during a cycle of operation.

Figure 1:
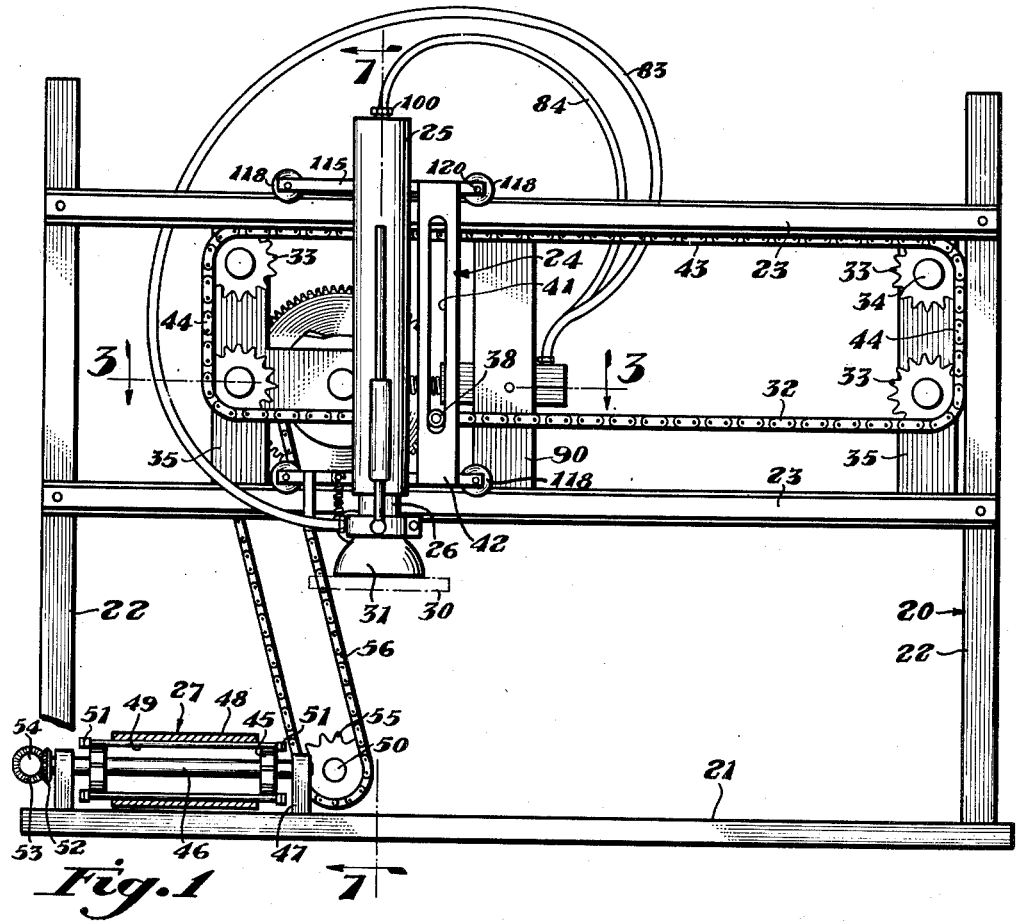
Figure 1 is a general side elevation of the transfer apparatus.

The preferred embodiment of the apparatus of the present invention which is capable of performing functions of the type described comprises a frame indicated generally at 20, Figure 1 having a lower cross rail 21, a pair of vertical support columns 22—22 and a pair of tracking rails 23—23 secured to the upper portion of the support columns 22. A carriage indicated generally at 24 is carried by rollers upon the tracking rails 23 for horizontal translation relative to the frame 20. Upon the carriage 24 is secured a pneumatic cylinder 25 mounted in a vertical position relative to the carriage and within the cylinder is slidably sustained a pick-up plunger 26. The carriage therefore carries the cylinder and plunger in a horizontal path and the plunger 26 is reciprocated vertically by the application of vacuum to the cylinder in timed relation to the horizontal movements of the cylinder.

Figure 14:
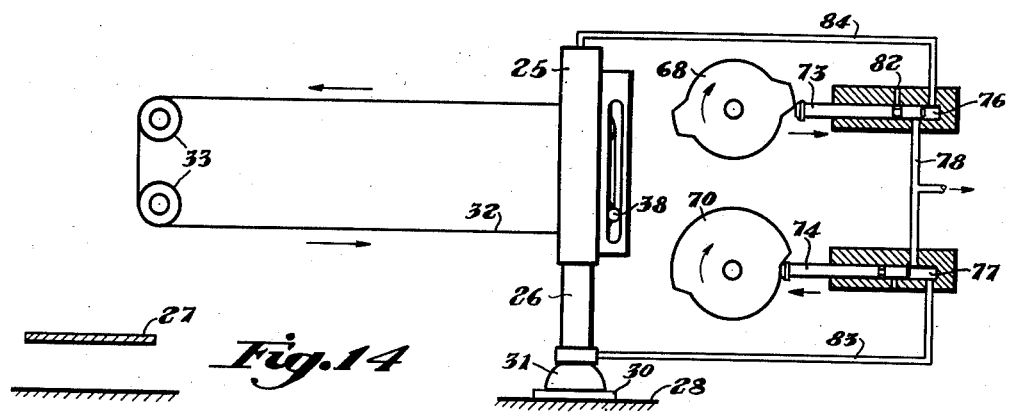
Figure 15:
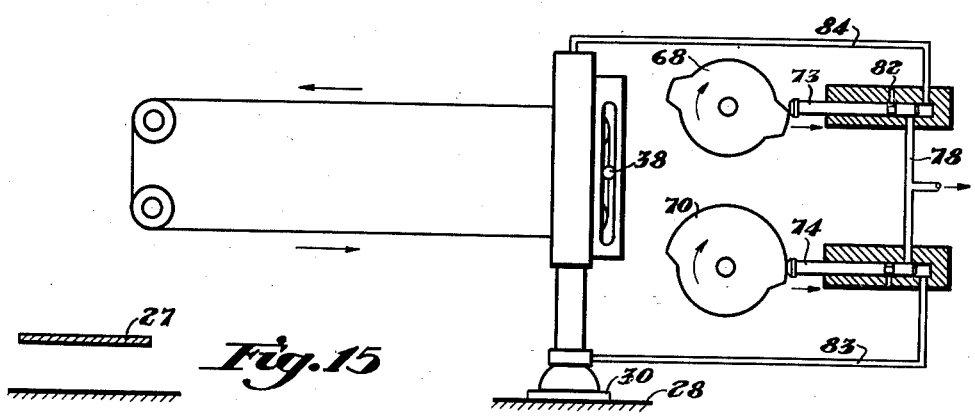

As shown in Figures 11 to 16, the carriage assembly 24 reciprocates laterally between a primary conveyor, indicated diagrammatically at 27, and a transverse station, indicated diagrammatically at 28. The mechanism for reciprocating the carriage assembly is arranged to pause for a timed interval during which the cylinder and plunger 25 and 26 are poised in a position relative to the approximate center line of the conveyor 27. During this dwell period, the conveyor 27, which operates intermittently in timed relation to the transfer apparatus, likewise is stationary, in other words, the transfer apparatus is timed relative to the conveyor 27 so that the period of conveyor dwell corresponds to the period of carriage dwell. During this period the plunger 26 descends into contact with one of the tiles 30 carried by the conveyor, vacuum then is applied to the suction cup 31, as shown in Figure 12, after which suction is applied to the cylinder as shown in Figure 13. This causes the plunger 26 to assume its elevated position with the tile gripped by the suction cup. The carriage assembly 24 then is translated to the right, as shown in Figure 14, and atmospheric pressure is admitted to cylinder 25 to permit the plunger 26 to descend. After the tile is deposited, atmospheric pressure is admitted to the suction cup 31 to release the tile. Vacuum then is applied to cylinder 25 to elevate the plunger and permit the carriage and cylinder assembly to be returned to its pick-up position relative to conveyor 27, to repeat the cycle.

Figure 2:
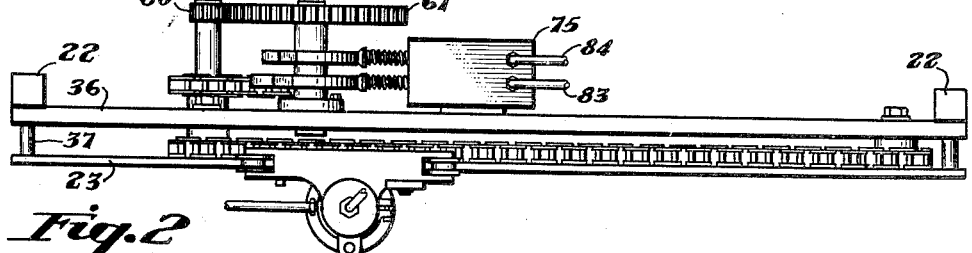
Figure 2 is a top plan view as projected from Figure 1 further illustrating the assembly.

Described in detail with reference to Figures 1, 2 and 7, the carriage 24 is translated or reciprocated relative to the conveyor transfer stations by means of a sprocket chain 32 engaged upon four sprockets indicated at 33 which are arranged in pairs at opposite ends of tracks 23. The sprockets are arranged in pairs at each end and are spaced apart vertically to form a rectangular chain run. The respective pairs of sprockets 33 are journalled upon stub shafts 34 which are secured to vertical bearing plates 35—35 at respective opposite ends of the track 23. Bearing plates 35 are secured, preferably by welding, to a pair of spaced cross beams 36—36 disposed behind and parallel with the tracking rails 23. The opposite ends of cross beams 36 are secured to the vertical columns 22, and the tracking rails 23 are secured to the cross beams 36 by means of a series of spacers 37.

Sprocket chain 32 includes a laterally extended roller 38 (Figures 1 and 3) journalled on a stub shaft 40 and engaged in an elongated slot 41 formed in a vertical plate 42 secured to the carriage 24. It will be apparent that the lineal travel of chain 32 will cause roller 38 to travel in a rectangular path, and being engaged in slot 41, causes the carriage to be translated with the chain. Upon reaching the end of the horizontal run 43 of the chain, the roller will travel vertically up and down the vertical end runs 44.

During this period the roller traverses the slot 41, holding the carriage and cylinder assembly stationary. Upon passing around a sprocket 33 to the horizontal run of the chain, the roller will of course change its direction from vertical to horizontal and move the carriage in the opposite direction. This operation will be apparent from an inspection of Figures 1 and 11 to 16 inclusive, the carriage being shown in the translating phase of its cycle in Figure 1.

It is to be noted that the reach of the transfer apparatus may be lengthened or shortened as desired by increasing or decreasing the length of frame 28 and tracks 23, and providing an appropriate chain length and gear ratio.

As previously noted, the transfer mechanism operates in timed relationship with a primary conveyor system 27. For this purpose the mechanism preferably is driven by direct connection with the power unit of the conveyor. Various drive systems may be employed for this purpose, one of which is illustrated in Figures 1 and 7 as an example.

The conveyor 27 may follow any standard construction, and as disclosed in Figure 1, it is carried upon a pair of sprockets 45—45 secured upon a shaft 46 which is journalled in a pair of spaced bearing blocks 47. The conveyor belt 48 is supported upon a series of cross rods 49 extending across and secured to the spaced links 51, thus providing an articulated belt or sprocket chain. The cross rods 49 of course mesh with sprockets 45—45 in the usual manner. A positive drive connection between shaft 46 and conveyor 27 thus is established so that the lineal travel of the conveyor belt is timed relative to the transfer apparatus. Shaft 46 may be powered by a bevel gear 52 meshing with a bevel gear 53 secured upon a drive shaft 54, the opposite end of which is connected to an intermittent drive unit (not shown). This unit in turn is driven by a continuous power unit, thereby causing intermittent advancement of the conveyor.

Figure 4:
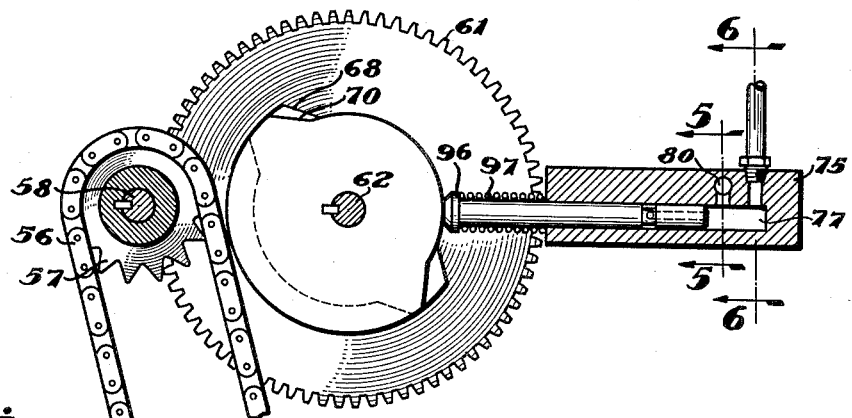
Figure 4 is a sectional view taken on line 4—4, Figure 3 further detailing the gear train, actuating cams, and pneumatic control valve for operating the plunger and suction cup.

The transfer mechanism is driven continuously but in time with the conveyor by a drive shaft 50 parallel with shaft 54, having its opposite end connected to the conveyor power unit through suitable gearing. A sprocket 55 is keyed to shaft 50 and is provided with a sprocket chain 56, the upper end of which passes over a driven sprocket 57 (Figure 4). Sprocket 57 is keyed upon a shaft 58 the outer end of which carries one of the sprockets 33 for driving the carriage chain 32, therefore chain 32 is driven continuously. It is to be noted at this point that the carriage 24 is timed to complete its horizontal translating cycle during the advance of conveyor 27 so that the conveyor is stationary when the carriage pauses to pick up a tile from it.

Upon the opposite end of shaft 58 is keyed a pinion 60 meshing with a driven gear 61 keyed upon a shaft 62. Shafts 58 and 62 are rotatably journalled upon the previously noted bearing plate 35 at the left hand of the assembly as viewed in Figure 1. A spacer 63 is disposed upon shaft 58 to space pinion gear 60 laterally in line with the driven gear 61 and a bushing 64 having a flange 65 secured to a laterally extended portion 66 of plate 35 by means of screws 67 provides a bearing for shaft 62.

On shaft 62 between the bushing 64 and driven gear 61 is located a pair of valve actuating cams 68 and 70. These cams are keyed as at 69 to the shaft 62 and are maintained in spaced relationship by means of collars 71 and 72 in alignment with a pair of valve plungers 73 and 74 slidably disposed in a valve block 75 as hereinafter disclosed. It will be apparent from the foregoing, that rotation of the conveyor drive unit is transmitted directly from shaft 50 through sprocket 55, chain 56, driven sprocket 57 to chain 32 to translate the carriage 24. Cams 68 and 70 for actuating the valve plungers 73 and 74 also are driven in time with the chain 32. The transfer mechanism therefore operates in timed relationship with the conveyor, the carriage reciprocating laterally relative to the conveyor, and the plunger descending and ascending vertically during the dwell periods of the carriage to pick up or deposit a tile. The suction cup of course is exhausted of air for the proper time interval to pick up a tile and hold it during carriage translation. As hereinafter disclosed the valve plungers 73 and 74 of the valve 75 control the application and relief of vacuum to the cylinder and suction cup respectively, in step with the transfer movements of the carriage.

Figure 3:
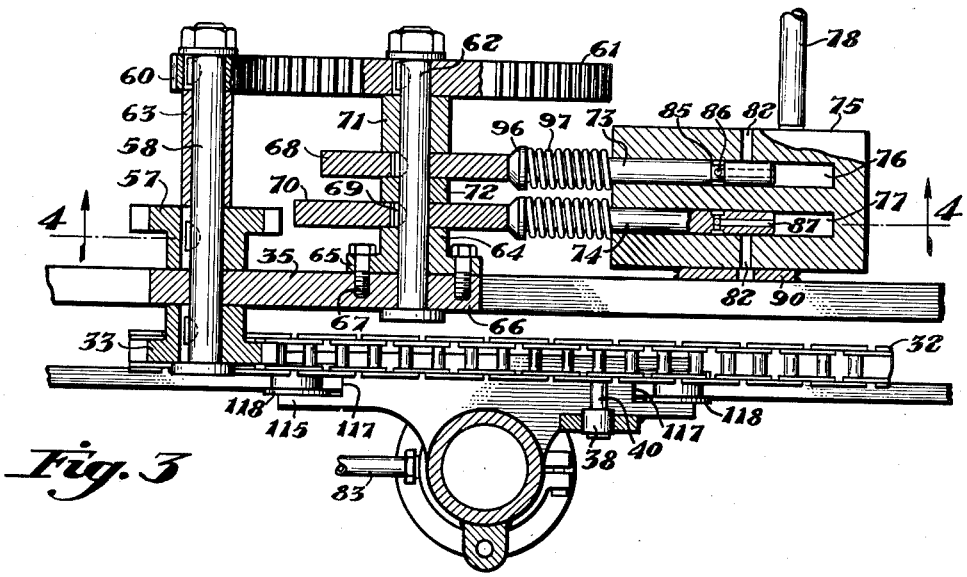
Figure 3 is a sectional view taken on line 3—3, Figure 1 illustrating the drive mechanism and control valve for the apparatus.
Figure 5:
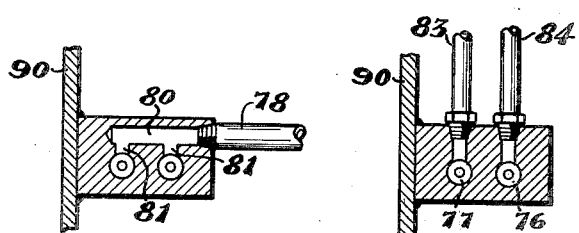
Figure 5 is a sectional view taken on line 5—5, Figure 4, further detailing the control valve and illustrating the vacuum line and its passageways.
Figure 6:
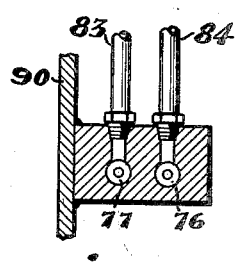
Figure 6 is a sectional view taken on line 6—6, Figure 4 similar to Figure 5 showing the passageways and control lines for the suction cup and plunger respectively.

As shown in Figures 3 and 4, the valve 75 includes a pair of bores 76 and 77 in which are slidably disposed the respective valve plungers 73 and 74. A vacuum line 78 is connected into one side of the valve block 75 and communicates with a transverse passageway 80 (Figure 5) which communicates in common with the respective bores 76 and 77 through vertical passageways 81—81. The valve block further is provided with vacuum relief passageways 82—82 (Figure 3) likewise extending laterally from the outside of the block and in communication with the respective bores 76 and 77, for purposes hereinafter described. In the position shown both plungers are in their extended positions, therefore, the vacuum line 78 is open through lateral passageway 80 to both bores 76 and 77. It will be apparent therefore that the air line 83 to the pick-up cup 31 and air line 84 to the cylinder 25, which communicate respectively with bores 76 and 77, are under vacuum, thus maintaining the plunger 26 in its elevated position and maintaining the suction cup 31 under vacuum. In this valve position the carriage is traveling to the right with a tile or work piece positioned on the open end of the pick-up cup and maintained thereon due to the vacuum line 83 (Figure 1). When the carriage and cylinder reaches its right hand limit of travel, the plunger 73 for cylinder 25 will be depressed by cam 68 to cut off from the valve bore 76 the vacuum from line 78 (Figure 14). When this occurs, the necked portion 85 of plunger 73 will be in alignment with the relief passageway 82, permitting air to enter the hole 86 drilled in neck 85 and to flow into the bore 76 through the longitudinal passageway 87 extending to the inner end of the plunger and in communication with hole 86. Therefore when cam 68 depresses valve plunger 73, atmospheric pressure flows into line 84, into the upper end of cylinder 25, permitting the plunger 26 to descend by gravity to the stacking station. It also will be noted at this point in the cycle (Figure 14) that roller 38 is beginning its upward run in slot 41, holding the carriage 24 stationary for a period of dwell. After the plunger has descended, cam 70 depresses plunger 74 (Figure 15) which likewise is provided with a necked portion 85 and an aperture 86 communicating with a longitudinal bore 87 to permit atmospheric pressure to enter bore 77. In the position shown therefore, atmospheric pressure flows through line 83 to the pick-up cup 31 thereby releasing its grip upon the tile 30.

Described in greater detail with reference to Figure 1, valve block 75 is mounted upon an intermediate vertical plate 90, similar to the plates 35—35, and secured to the cross beams 36 in a similar manner. As illustrated the valve block is welded to the vertical plate although it may be secured by screws or other means if desired. The respective valve plungers 73 and 74 are provided with heads 96 bearing against the respective cams 68 and 70. A coil spring 97 is disposed on the respective plungers, in compression between the valve block and the heads 96, to maintain the plungers under compression against the cams.

The vacuum lines 83 and 84 are of flexible tubing to permit the carriage 24 to be translated relative to the valve 75, and plunger 26 to be reciprocated relative to the cylinder 25. The cylinder vacuum line 84 enters the upper end or head 99 of the cylinder 25 by means of a coupling 100, screw threaded into the head, as illustrated in Figure 7. The cylinder head is screw threaded as at 101 into the upper end of the cylinder and a gasket 102 is interposed between the upper end of the cylinder and the flange 103 of the head. The plunger 26 is coextensive with the cylinder 25 and may be in the form of a cylindrical bar slidably fitted into the cylinder bore. The plunger is of sufficient length to be lowered to its lower limit of travel with a sufficient length remaining in the cylinder to prevent binding.

In order to prevent rotation of the plunger relative to the cylinder, a guide rod 104 is secured to the lower end of the piston by means of an angular fitting 105 screwed into a clamping ring 106 which surrounds and clamps the suction cup 31 to the plunger (Figure 7). The guide rod 104 slidably extends through a guide sleeve 107 which is secured by welding or other means to the cylinder 25, and is of sufficient length to guide the rod 104 freely and without likelihood of binding.

The ring 106 serves as a clamp to secure the suction cup 31 to the lower end of the plunger as shown in Figure 9. For this purpose the suction cup, which preferably is of rubber or a plastic having similar qualities, includes a sleeve portion 108 slipped upon the lower end of plunger 26. The ring includes a gap defined by a pair of ears 109 which are drawn together by means of a screw 110 to clamp the suction cup to the plunger.

The vacuum line 83 to the cup includes a fitting 111 which also is screwed into the clamping ring 106 (Figures 9 and 10). The sleeve portion 108, and the lower end of plunger 26 are provided with an aperture 112 opening into a vertical bore 113 formed in the lower end of plunger 26. Suction applied on line 83 through valve 75 therefore communicates with the suction cup 31 through bore 113. When the lower end of the cup is resting upon a tile or work piece, vacuum is developed inside the cup to firmly grip the article for transfer.

The carriage 24 which supports cylinder 25 comprises a pair of plates 115—115 (Figures 1, 3 and 7) secured at the upper and lower ends of the cylinder, preferably by means of welding as at 116. Extending vertically between the plates 115—115, is the slotted plate 42, having its opposite ends secured to the respective plates preferably by welding. The opposite ends of the carriage plates 115—115 are bifurcated as at 117—117 to receive respective guide rollers 118—118. These rollers are journalled upon pivot pins 120 extending through the bifurcated ends of the carriage plates, and the face of each roller 118 is grooved as at 121 to engage the tracking rails 23 (Figure 7).

In order removably to secure the carriage in place upon the tracking rails 23, the lower carriage plate 115 is provided with a supplemental roller 122 similar to the rollers 118, but engaging the lower edge of the lower tracking rail 23 (Figure 8). Roller 122 is journalled upon a pivot pin 123 secured in an arm 124, which is bifurcated in a manner similar to the carriage plates 115, to receive the roller. The opposite end of arm 124 is pivoted as at 125 upon a vertical spur 126 extending downwardly from the lower carriage plate 115, and secured thereto preferably by welding. A tension spring 127 has its upper end anchored upon a pin 128 of plate 115, and its lower end is anchored upon a pin 130 secured to the arm 124. Spring 127 therefore draws the arm 124 and roller 122 into engagement with track 23 to pull the carriage and cylinder assembly downwardly into more positive engagement with the tracks. If necessary, the assembly may be removed from the tracks by swinging arm 124 downwardly against the tension of spring 127. This permits the carriage to be lifted out of engagement with the tracks to permit lateral removal of the assembly.

As previously noted, the valve 75 operates in timed relationship with the movements of the carriage and cylinder so as to raise and lower plunger 25 during the dwell periods at opposite end runs 44 of chain 32. For this purpose the ratio between pinion gear 60 and driven gear 61 is such that the cams 68 and 70 make one complete revolution for each complete cycle of carriage translation. In other words one complete circuit of the chain 32 about its rectangular path is equal to one complete rotation of the cams. The cams of course are related to the chain to cause actuation of the plunger and suction cup in properly timed intervals during the dwell position of the carriage as indicated in the diagrammatic views in Figures 11 to 16 inclusive.

If it is desired to reverse the operation so as to employ the apparatus for loading the conveyor from stacks instead of unloading it, the driving direction of the transfer apparatus is reversed relative to the conveyor. This causes the plunger to descend, apply vacuum to engage and elevate the work piece at the stacking station and to descend and release the work piece on the conveyor. Reverse operation also can be effected by changing the timing of the carriage translation relative to the cams if it is not desired to change the driving direction or by sliding pinion 60 out of mesh and rotating gear 61 and the cams 68 and 70, from their former position. In either case, the chain 32 and carriage is repositioned 180° from its former position relative to the cams. This will cause descent of the plunger and relief of the suction cup at the conveyor 27 instead of at the stacking station 28 to transfer work pieces from the stack to the conveyor.

*Description of operation*

Referring to Figure 11, the carriage and cylinder assembly is shown at its position of dwell, with the roller 38 beginning its downward course in the slot 41. At this point the cylinder control cam 68 has just depressed plunger 73 to vent vacuum line 84 to the cylinder, permitting atmospheric pressure to enter the cylinder through valve port 82, through plunger 73 to line 84. The plunger therefore is permitted to descend by gravity upon the tile 30, carried by conveyor 27. In this position cam 70, controlling suction cup 31, is holding its plunger 74 in depressed position so that the cup is vented to the atmosphere.

Referring to Figure 12, it will be noted that cylinder cam 68 is about to release cylinder plunger 73 to apply vacuum to elevate plunger 26. At this point, cam 70 has permitted its plunger 74 to move outwardly to cause vacuum to be applied to the cup, which is resting upon the tile. In the next phase of operation (Figure 13), roller 38 is about to translate the carriage and cylinder to the right, and plunger 73 has moved outwardly, to apply vacuum to line 84 to the cylinder to elevate the plunger. It will be noted also that cam 70 will maintain plunger 74 in valve open position to apply vacuum to the cup 31 during its horizontal work transfer movement.

Figure 16:
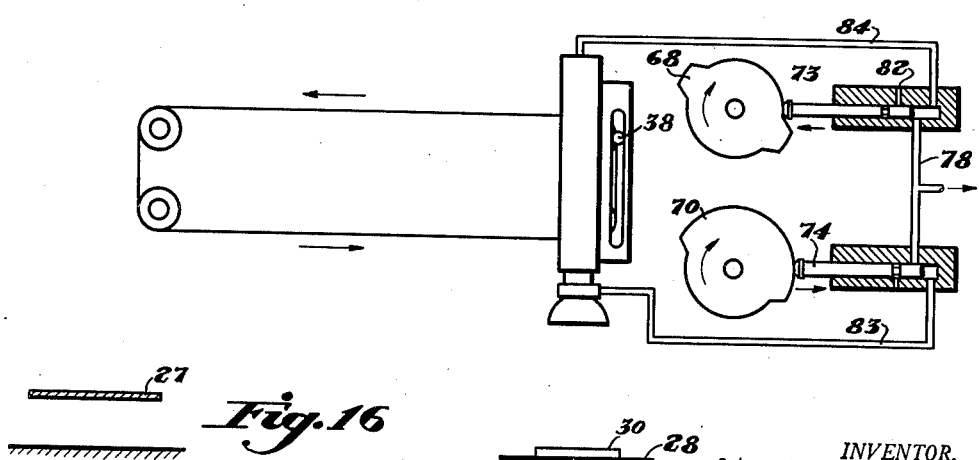

Referring to Figure 14, the carriage assembly has completed its transfer movement with the roller 38 at the beginning of its upward run in slot 41 for a dwell period. In this position it will be noted that plunger 73 has just been depressed to its relief position. Thus the cylinder is vented to the atmosphere through the aperture 82, permitting the plunger to descend by gravity to station 28. During the next phase of operation (Figure 15), plunger 74 is depressed to admit atmospheric pressure to the suction cup to release its grip upon the tile 30. In Figure 16 plunger 73 has reached its extended position, applying vacuum to cylinder 25 causing plunger 25 to assume its elevated position, leaving the tile deposited at the station 28. The roller 38 at this point is about to convey the carriage back to its starting position to complete the cycle of operation.

It will be apparent that the tiles or articles to be transferred necessarily must be placed on the conveyor 27 at spaced intervals corresponding to the intermittent longitudinal movements of the conveyor 27. The position of these tiles of course must be correlated to the location of the transfer mechanism so that each tile is presented in alignment with the suction cup when the conveyor pauses and the cup descends to pick it up. For this reason the conveyor necessarily operates in timed, step by step relationship with the production machines which it serves. If necessary, one or several of the transfer machines may be reversed and interposed between a production machine and the conveyor 27, to load the conveyor. Being in step with the unloading transfer machines, each tile will be properly located on the conveyor for engagement by the unloading machine.

Since the cylinder assembly operates in a fixed path and dwells at a fixed point relative to the conveyor 27 and stacking station 28, the tiles are deposited one upon the other with the same accuracy with which they were positioned on the conveyor. In other words, each individual tile in the stack occupies the same position relative to the other tiles as on the conveyor.

Since the operation of the plunger is controlled by air flow, the descending movement of the plunger may be regulated so as to avoid shocks tending to fracture or damage the work pieces. In other words, the rate of descent of the plunger 26 by gravity is controlled by the size of the relief aperture 82 which admits a metered flow of air into the cylinder. By regulating the size of this opening the desired rate of descent accurately is achieved.

If the transfer mechanism is utilized to stack the tiles in racks for firing, the rack is positioned to receive the tiles at the unloading station and the plunger will automatically deposit one tile upon another to build up a stack. It will be observed that since the plunger is completely elevated during its transfer movement, a stack can be formed to the height of the elevated plunger. As the height of the stack increases the plunger merely descends a lesser distance, rests upon the stack during the dwell period still gripping the tile, then releases the tile and again ascends to its elevated position. It will be apparent that as the maximum height of the stack is approached the descent and ascent of the plunger decreases. When the maximum stack height is reached, the stack is removed and the stacking operation is repeated.

The same procedure may be applied to the stacking of the tiles in cartons or boxes for shipment. In this instance the carton is placed at the unloading station and the stack is built up in the same manner. In elevated position the plunger and tile is sufficiently high to clear the side of the carton, it then descends and deposits the stack in the same manner as previously described. The carton of course may be designed to ship a plurality of stacks in which case it may be moved from time to time as required to properly place the stacks in the carton. If desired, the carton may be provided with partitions to prevent the various stacks from contacting each other.

It is contemplated also, in certain installations, to utilize a battery of transfer plungers, the plungers operating in unison to transfer a plurality of tiles from the conveyor to the stacking station. This can be accomplished by adding a sufficient number of pneumatic cylinders 25 and plungers 26, so spaced to meet needed requirements of the installation. In this case, manifold type fittings such as 83 and 84 to allow individual vacuum and air controls to each pneumatic cylinder are provided.

In such cases the conveyor is arranged to advance a distance equal to the number of tiles which may be simultaneously transferred and operation is identical to that previously described, each of the several transfer plungers operating simultaneously in timed relation to the primary conveyor. In this instance the loading apparatus for the main conveyor likewise will deposit a series of tiles at properly spaced intervals. A battery of transfer plungers, with operation reversed for loading may be applied to the conveyor for this purpose.

As applied to the transfer of articles from a primary conveyor to a branch line the operation of the apparatus will be the same as above described, except that instead of forming stacks, the branch conveyor will advance the tiles serially each time a tile is deposited. In an installation of this nature, a battery of plungers likewise may be employed to deposit simultaneously a course or row of tiles widthwise of the branch line. By way of example, the transfer mechanism may be employed to transfer unfinished tiles from a primary conveyor to a branch conveyor forming a part of the processing apparatus. Thus the unfinished tiles may be conveyed along a primary conveyor and transferred at one or a series of stations along the line into continuous treating apparatus. After leaving the treating apparatus the tiles may again be transferred to other branch lines for further treatment or back to the primary line. In this manner the apparatus may be utilized to interconnect numerous branch lines, in some cases to form a continuous automatic treating apparatus.

Having described my invention, I claim:

1. A transfer apparatus for work pieces comprising, a frame, a carriage translatably mounted upon said frame, an endless driving loop arranged to provide a pair of parallel horizontal runs and a pair of vertical runs, a driving element mounted on the driving loop, a driven member mounted on the carriage, the driving element being connected to the driven member and confined against horizontal movement relative to the driven member and adapted to move vertically relative to the driven member and thereby translate said carriage upon said frame and to provide a carriage dwell period at the limits of translation, a vacuum operated plunger carried by said carriage adapted to be reciprocated vertically relative to the work pieces, a vacuum operated suction cup secured to the lower end of said plunger, a shiftable valve adapted to control the application of vacuum respectively to the said plunger and suction cup, rotatable valve operating means connected to said valve adapted to shift the valve, a rotatable drive shaft connected to the driving loop and adapted to advance the same, and a driving connection between the drive shaft and valve operating means adapted to rotate the valve operating means and thereby shift the valve in positions to release and apply vacuum relative to the plunger and thereby to lower and elevate said plunger relative to the carriage during said carriage dwell periods, the valve being adapted to apply vacuum to said suction cup to cause the suction cup to engage a work piece when said plunger is lowered and thereby transfer the same when the plunger is elevated and translated.

2. An apparatus for transferring work pieces comprising, a frame, a carriage translatably mounted upon said frame, an endless driving loop associated with the frame and arranged to move in a rectangular path, a driving element on the endless driving loop, a driven member mounted on the carriage, the driving element being connected to the driven member and confined against horizontal movement relative thereto and adapted to move vertically relative to the driven member and thereby translate said carriage horizontally upon said frame and adapted to provide a dwell period at the limits of carriage translation, a vacuum operated plunger carried by said carriage adapted to be reciprocated vertically relative to the carriage, a vacuum operated suction cup mounted on the lower end of said plunger, a valve adapted to control the application of vacuum to the plunger and suction cup respectively, said valve having a shiftable control member for the plunger and a second shiftable control member for the suction cup, a drive shaft journalled with respect to said frame and in driving connection with said endless driving loop, a cam shaft journalled with respect to the frame and spaced from said drive shaft, driving means connecting the cam shaft to the drive shaft, a pair of cams mounted upon the cam shaft, said cams being in operative engagement respectively with the shiftable control members of said valve and adapted to shift said control members in time with one another and in time with the dwell periods of the carriage, the shiftable members being constructed and arranged to lower and raise the plunger at each dwell period of the carriage and to apply vacuum to the suction cup when the plunger is lowered at one dwell period, to maintain said vacuum while the carriage is translated, and to release said vacuum after the plunger is lowered at a second dwell period.

3. An apparatus for transferring work pieces laterally relative to a longitudinal conveyor comprising, an elongated frame extending over the conveyor, a carriage translatably mounted upon said frame, an endless driving loop associated with the frame having a pair of horizontal runs and a pair of vertical runs, connecting means between the driving loop and carriage arranged to translate the carriage relative to the frame as the connecting means travels across the horizontal runs of the driving loop, the connecting means being adapted to provide a carriage dwell period as the connecting means traverses the said vertical runs, a cylinder mounted upon said carriage, a vacuum operated plunger slidably disposed within said cylinder, a vacuum operated suction cup mounted upon the lower end of said plunger and adapted to establish a surface engagement with a work piece upon application of vacuum to the suction cup, a respective vacuum line connected to the cylinder and suction cup for actuating said plunger and for engaging and disengaging the suction cup relative to the work pieces, shiftable valve means interposed in said respective vacuum lines adapted to control the application of vacuum to the cylinder and suction cup, a rotatable drive shaft in driving connection with the driving loop, a rotatable valve shifting element associated with said shiftable valve means, and a driving connection between the drive shaft and the rotatable valve shifting element, whereby the valve shifting element is operable to shift the valve means in respective positions to apply vacuum to and relieve vacuum from the cylinder and thereby to raise and lower the plunger during the dwell periods of the carriage, the valve means being operable to apply vacuum to and relieve vacuum from the suction cup in time with the raising and lowering of the plunger and in time with the translations of the carriage and thereby to pick up and transfer work pieces successively with respect to said conveyor during the carriage translations.

4. An apparatus for transferring work pieces laterally from a conveyor and stacking the same at a station adjacent the conveyor comprising, a power unit for the conveyor, an elongated frame extending between the receptacle and conveyor, a carriage translatably mounted upon said frame, a continuously driven endless driving chain arranged in a rectangular loop providing respective pairs of horizontal and vertical runs, the endless driving chain being in driving connection with the conveyor power unit and driven continuously thereby, a carriage driving member extending from the endless driving chain, a driven member mounted on the carriage, said driven member having a substantially vertical slot confining said carriage driving member, said slot being adapted to provide vertical movement of the carriage driving member as the same travels across the vertical runs of the driving chain and thereby provide carriage dwell periods at the limits of carriage translation, a cylinder mounted upon said carriage, a plunger slidably disposed within said cylinder, a pick-up suction cup mounted upon the lower end of said cylinder adapted to establish a surface engagement with a work piece, a valve having a pair of shiftable valve plungers, a pair of vacuum lines extending from the valve respectively to the cylinder and pick-up cup, the plungers being adapted to control the engagement of said pick-up cup and the reciprocation of said plunger, a drive shaft in driving connection with the driving chain, a cam shaft, a pair of cams on said shaft in driving connection respectively with said shiftable valve plungers, and a driving connection between the drive shaft and cam shaft, whereby vacuum is applied and relieved with respect to the plunger and pick-up cup in timed relationship with the advance of the conveyor successively to pick up and transfer a work piece from said conveyor and deposit the same at said station.

5. An apparatus for transferring work pieces comprising, a frame, a translatable carriage carried by said frame, an endless chain having at least one substantially horizontal run and at least one substantially vertical run, a driving member mounted on said carriage and engaging said driving member, said driving member being movable vertically relative to the said driven member to provide a stationary dwell period as the driving member travels along the vertical run of said endless driving chain and being adapted to translate the carriage horizontally relative to said frame as the driving member travels along the horizontal run, a cylinder secured to said carriage, a plunger slidably disposed by said cylinder, a suction cup secured to the lower end of said plunger, a control valve having a pair of plungers for said cylinder and suction cup respectively, a cam shaft, a pair of cams mounted on said shaft and adapted to actuate said plungers, a rotatable drive shaft in driving connection with said endless chain, and a driving connection between said drive shaft and cam shaft adapted to rotate the cam shaft, whereby said cams are rotated in timed relation to the movement of said chain to operate said valve plungers in step with said carriage translation.

References Cited in the file of this patent

UNITED STATES PATENTS

| Number | Name | Date |
|---|---|---|
| 1,461,222 | Myers | July 10, 1923 |
| 1,641,067 | Connelly | Aug. 30, 1927 |
| 1,845,839 | Hoge et al. | Feb. 16, 1932 |
| 1,926,041 | Freese | Sept. 12, 1933 |
| 1,979,763 | Olson | Nov. 6, 1934 |
| 2,166,871 | Luertzing | July 18, 1939 |
| 2,247,787 | Schmidt | July 1, 1941 |
| 2,301,892 | Lewis | Nov. 10, 1942 |
| 2,359,433 | McNamara | Oct. 3, 1944 |
| 2,386,043 | Everett | Oct. 2, 1945 |